(12) United States Patent
Ayyaswami (10) Patent No.: US 10,643,181 B2
(45) Date of Patent: May 5, 2020

(54) SYSTEM AND METHOD FOR A BIG DATA ANALYTICS ENTERPRISE FRAMEWORK

(71) Applicant: Satish Ayyaswami, Kanchipuram District (IN)

(72) Inventor: Satish Ayyaswami, Kanchipuram District (IN)

( * ) Notice: Subject to any disclaimer, the term of this patent is extended or adjusted under 35 U.S.C. 154(b) by 62 days.

(21) Appl. No.: 14/828,518

(22) Filed: Aug. 18, 2015

(65) Prior Publication Data

US 2017/0053242 A1  Feb. 23, 2017

(51) Int. Cl.
| | | |
|---|---|---|
| *G06Q 10/10* | (2012.01) | |
| *H04L 29/06* | (2006.01) | |
| *G06F 8/20* | (2018.01) | |
| *G06F 16/22* | (2019.01) | |
| *G06F 16/2457* | (2019.01) | |
| *G06N 20/00* | (2019.01) | |
| *G06F 8/34* | (2018.01) | |

(52) U.S. Cl.
CPC ............ *G06Q 10/103* (2013.01); *G06F 8/20* (2013.01); *G06F 16/22* (2019.01); *G06F 16/24578* (2019.01); *G06N 20/00* (2019.01); *H04L 63/105* (2013.01); *G06F 8/34* (2013.01)

(58) Field of Classification Search
CPC ............ G06Q 10/103; G06F 17/30312; G06F 17/3053; G06F 8/20; G06F 16/24578; G06F 16/22; G06F 8/34; H04L 63/105; G06N 7/005; G06N 20/00
See application file for complete search history.

(56) References Cited

U.S. PATENT DOCUMENTS

| | | | |
|---|---|---|---|
| 9,135,559 B1 * | 9/2015 | Chan | G06F 16/248 |
| 9,594,823 B2 * | 3/2017 | Chaney | G06F 17/30595 |
| 9,692,748 B2 * | 6/2017 | Maheshwari | G06F 8/60 |
| 9,916,538 B2 * | 3/2018 | Zadeh | G06N 7/005 |
| 2013/0117847 A1 * | 5/2013 | Friedman | H04L 63/102 726/22 |
| 2013/0290234 A1 * | 10/2013 | Harris | G06N 5/022 706/46 |
| 2014/0006169 A1 * | 1/2014 | Maag | G06Q 30/0277 705/14.69 |
| 2014/0006338 A1 * | 1/2014 | Watson | G06F 17/30563 707/602 |
| 2014/0075557 A1 * | 3/2014 | Balabine | H04L 63/20 726/23 |
| 2014/0082586 A1 * | 3/2014 | Casey | G06F 8/20 717/104 |
| 2014/0114962 A1 * | 4/2014 | Rosenburg | G06Q 10/063 707/723 |
| 2014/0266613 A1 * | 9/2014 | Sehmer | G06K 7/10366 340/10.1 |
| 2014/0279837 A1 * | 9/2014 | Guo | G06F 17/30589 707/603 |

(Continued)

*Primary Examiner* — Cheng-Feng Huang (57) ABSTRACT

A method and system for providing big data analytics framework for predictive and qualitative analysis for application developers, data scientists and system engineers without having technology specific programming experience. Further the framework contains adapters for the software engineers to configure the big data hub, wherein these software engineers can easily share, store, process and predict functionalities with the data scientists and user interface (UI) developers.

5 Claims, 8 Drawing Sheets

(56) References Cited

U.S. PATENT DOCUMENTS

| | | | | |
|---|---|---|---|---|
| 2014/0310243 A1* | 10/2014 | McGee | ............ | G06F 17/30575 |
| | | | | 707/639 |
| 2014/0359552 A1* | 12/2014 | Misra | ...................... | H04L 67/12 |
| | | | | 717/100 |
| 2015/0039444 A1* | 2/2015 | Hardin | ............... | G06Q 30/0273 |
| | | | | 705/14.69 |
| 2015/0277404 A1* | 10/2015 | Maturana | .............. | G06F 9/5072 |
| | | | | 700/83 |
| 2015/0317197 A1* | 11/2015 | Blair | ..................... | G06N 7/005 |
| | | | | 714/47.3 |
| 2015/0347096 A1* | 12/2015 | Hanna | ..................... | G06F 8/36 |
| | | | | 717/107 |
| 2016/0088021 A1* | 3/2016 | Jayanti Venkata | ........ | G06F 8/60 |
| | | | | 726/1 |
| 2016/0110810 A1* | 4/2016 | Ashok | .............. | G06F 17/30522 |
| | | | | 705/36 R |
| 2016/0328719 A1* | 11/2016 | Ananchaperumal | ......................... G06Q 30/0201 | |

\* cited by examiner

SYSTEM AND METHOD FOR A BIG DATA ANALYTICS ENTERPRISE FRAMEWORK

FIELD OF THE INVENTION

The present invention relates to the field of big data analytics enterprise framework. More particularly, the present invention relates to a system and method for improved system and method for a big data analytics enterprise framework which simplifies big data analytics technologies for application developers, data scientists and system engineers.

BACKGROUND OF THE INVENTION

The concept of "big data" is already well-known in the field of information technology. Big data is a collection of tools, techniques and approaches used when data sets are large and complex that it becomes difficult or impossible to store, query, analyze or process using current database management and data warehousing tools or traditional data processing applications. The challenge of handling big data include capture, organize, storage, search, sharing, analysis and visualization. The trend to larger data sets is due to the proliferation of data capture devices and the ease of capturing and entering data from a wide variety of sources.

There are various aspects related to the big data analytics enterprise framework which need to be still addressed in order to increase the expectation, granularity and comprehensiveness of the date in order to make the analysis of the data into useful, easy to handle and be cost-effective.

Few aspects which need to be addressed or taken into account are like (a) Complexity, wherein a wide variety of different tools and techniques are needed to make Big Data Analytics work for an organization;

(b) Skill, wherein big data analytics requires unique programming and analysis skills that most programmers, developers, analysts and data scientists do not possess;

(c) Cost, wherein the demand for big data programming and analysis skills far outstrips supply, making people with such skills scarce and expensive;

(d) Time, wherein with the existing technology the time taken to perform the real time analytics on cloud is tough and cumbersome;

(e) Interdependency, wherein the software interdependency and appropriate resource unavailability makes the process of big data analytics very tedious;

(f) Inefficiency, wherein most of the tools for performing big data analytics is relatively new and people having those skill sets are facing difficulty in terms of high learning curve;

(g) Non availability, wherein there is non-availability of unified big data environments that allow big data storage & processing alongside predictive analytics functions Existing big data analytics framework does have aspects such as complex, skill based, time consuming, interdependency, inefficient and non-availability listed above which does not help application developers, data scientists and system engineers.

Data has become a key asset for most modern day enterprises. Managing this data has become a major problem for the IT departments of these companies and organizations. For many years, the changes in business requirements have made it more and more difficult and expensive for enterprises to keep abreast of the changes in data—firstly, because of continuous changes in the tools and standards, and secondly because of the exponential increase in the amount of data that is being made available.

Hence, there is a need for a system and method for improved system and method for a big data analytics enterprise framework which simplifies big data analytics technologies for application developers, data scientists and system engineers.

Objects Of The Invention

The principle object of the invention is to enable a method and system for a big data analytics enterprise framework which simplifies big data analytics technologies for application developers, data scientists and system engineers.

Yet another object of the invention is to enable a method and system for a big data analytics enterprise framework application without having any technology specific programming experience.

Yet another object of the invention is to perform big data analytics along with predictive features such as personalization, recommendation and content discovery which are essential factors in terms of end usage of the whole analysis and also outcome of the analysis.

Yet another object of the invention is to provide end to end big data application development, faster and intelligent analytical rules deployment, and user friendly interfaces for meaningful visualization.

Yet another object of the invention is to provide a unified framework to configure the big data hub, enable data processing technology and integrate intelligent and predictive analytics engines.

Advantages of the Invention

The present invention has following advantages:

The present invention enables a framework-as-a-service cloud computing framework that allows quick and easy development, deployment, administration and accessibility via specific APIs.

The present invention enables easy development and deployment of applications developed by many different third party developers using a set of services are made available in form of Application Programming Interfaces (APIs) and Software Development Kits (SDKs).

The present invention enables multiple sensor data providers, multiple application developers and application end users to connect with the framework in a secure and mutually isolated way for accessing various services and application facilitated by the framework.

The present invention enables any kind of structured or unstructured data to be shared across applications and users by facilitating policy driven data privacy and policy driven data on the framework.

The present invention also provides addition of more analytics capabilities to perform a wider range of analysis for insight generation and develop applications and visualizations that harness the power of the framework to drive value for various businesses.

The present invention also provides Internet of Things (IOT), wherein adding the ability of reading different types of sensors' signals and converting them to data, to be analysed and acted upon along with other structured and unstructured data. For e.g. Sensors: RFIDs, accelerometers, temp/pressure sensors etc.]

SUMMARY OF THE INVENTION

Before the present methods, systems and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention provides a system and method for a big data analytics enterprise framework which simplifies big data analytics technologies for application developers, data scientists and system engineers without having technology specific programming experience.

The present invention provides a framework contains adapters for the software engineers to configure the big data hub and can easily share, store, process and predict functionalities with the data scientists and user interface (UI) developers in the form of simple to understand REST APIs.

The present invention provides a framework which comes with built-in adapters for NoSQL Databases such as MongoDB and Cassandra, processing engines such as Hadoop and Storm and Analytics engines such as a PMML Scoring Engine and an' R' adapter etc. Further the framework is fortified with plug-ins including Support Vector Machines for Classification, Advanced Regression for Predictive analysis and K-Means Clustering for Segmentation.

The present invention framework supports both single-tenant and multi-tenant architectures. The Multi-Tenant is designed to suit service providers offering managed big data applications for multiple clients. The present invention can easily be deployed on-premise/on-cloud based on user request.

The present invention offers SSL based security at the data transport layer and OAuth security at the application level. Additionally the present invention provides role based access for various services and offers auditing support to enforce data governance protocols.

Further areas of applicability of the present invention will become apparent from the detailed description provided hereinafter. It should be understood that the detailed description and specific examples, while indicating the preferred embodiment of the invention, are intended for purposes of illustration only, since various changes and modifications within the spirit and scope of the invention will become apparent to those skilled in the art from this detailed description

BRIEF DESCRIPTION OF THE DRAWINGS

The novel features of the invention are set forth with particularity in the appended claims. The invention itself, however, both as to organization and methods of operation, together with further objects and advantages thereof, may be best understood by reference to the following description, taken in conjunction with the accompanying drawings; in which:

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

The systems and methods of the present invention are illustrated and described herein in connection with certain embodiments, with the perception that the present disclosure is to be regarded as an exemplification of the various aspects and principles of the present invention and the associated functional specifications required for their implementation. However, it should be appreciated that the systems and methods of the present invention may be implemented in still different configurations, forms and variations, based on the understandings herein.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "storage" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

Figure 1:
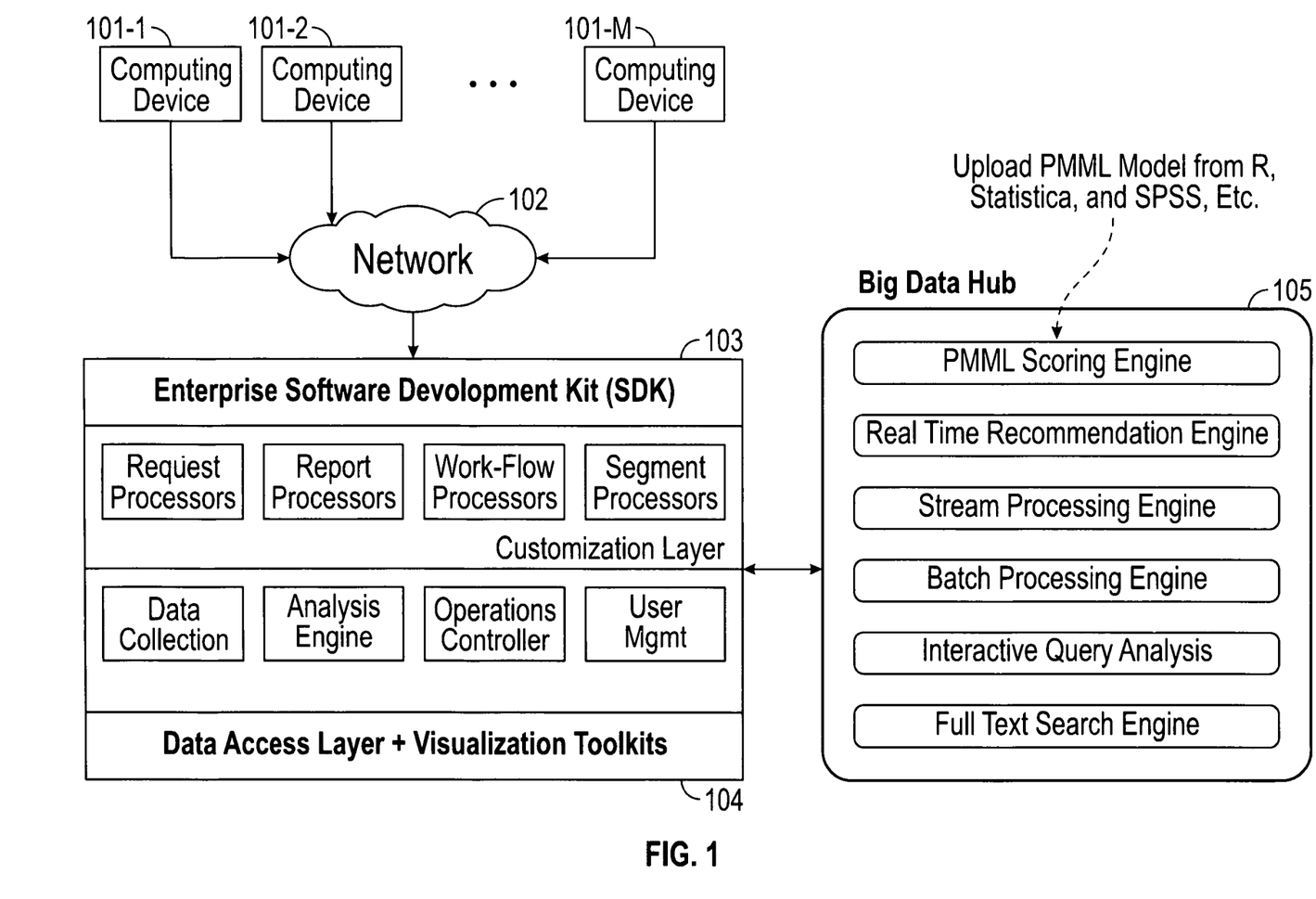
FIG. 1 is a schematic illustration of a system architecture displaying various hardware elements configured to perform big data analytics according to an exemplary embodiment of the present invention.

Referring to FIG. 1 is a system architecture diagram displaying various hardware elements configured to perform big data analytics according to an exemplary embodiment of the present invention.

As illustrated in FIG. 1, the system architecture comprises an enterprise framework software development kit (SDK) 103 for big data analytics, data access layer and visualization tool kits 104 and a Big Data hub 105. The system further comprises various client devices 101-1, 101-2, . . . , 101-M are coupled to a communication network (e.g., Internet, intranet, wireless network, wired network, combinations thereof) 102 via which the client devices are able to access cloud services from one or more service providers. Further the enterprise framework software development kit (SDK) 103 for big data analytics comprises request processors, report processors, work-flow processors and segment processors along with a customization layer comprising data collection, analysis engine, operations controller and user access control management. Further the Data access layer and visualization tool kits used to represent data in a visual format. Further Big data hub 105 has various layers in terms of deploy search and process big data information, wherein PMML scoring engine receives the uploaded PMML models from R. Statistica and SPSS and other similar data analytics and statistical tools. Further this model information is received by real time recommendation engine and stream processing engine and batch processing engine and an interactive query analysis and full text search engine is created and developed and tested to send data on to Data access layer and visualization tool kits in order to make analysis of the data and its predictive/forecasting information of the Big data analysed.

Figure 2:
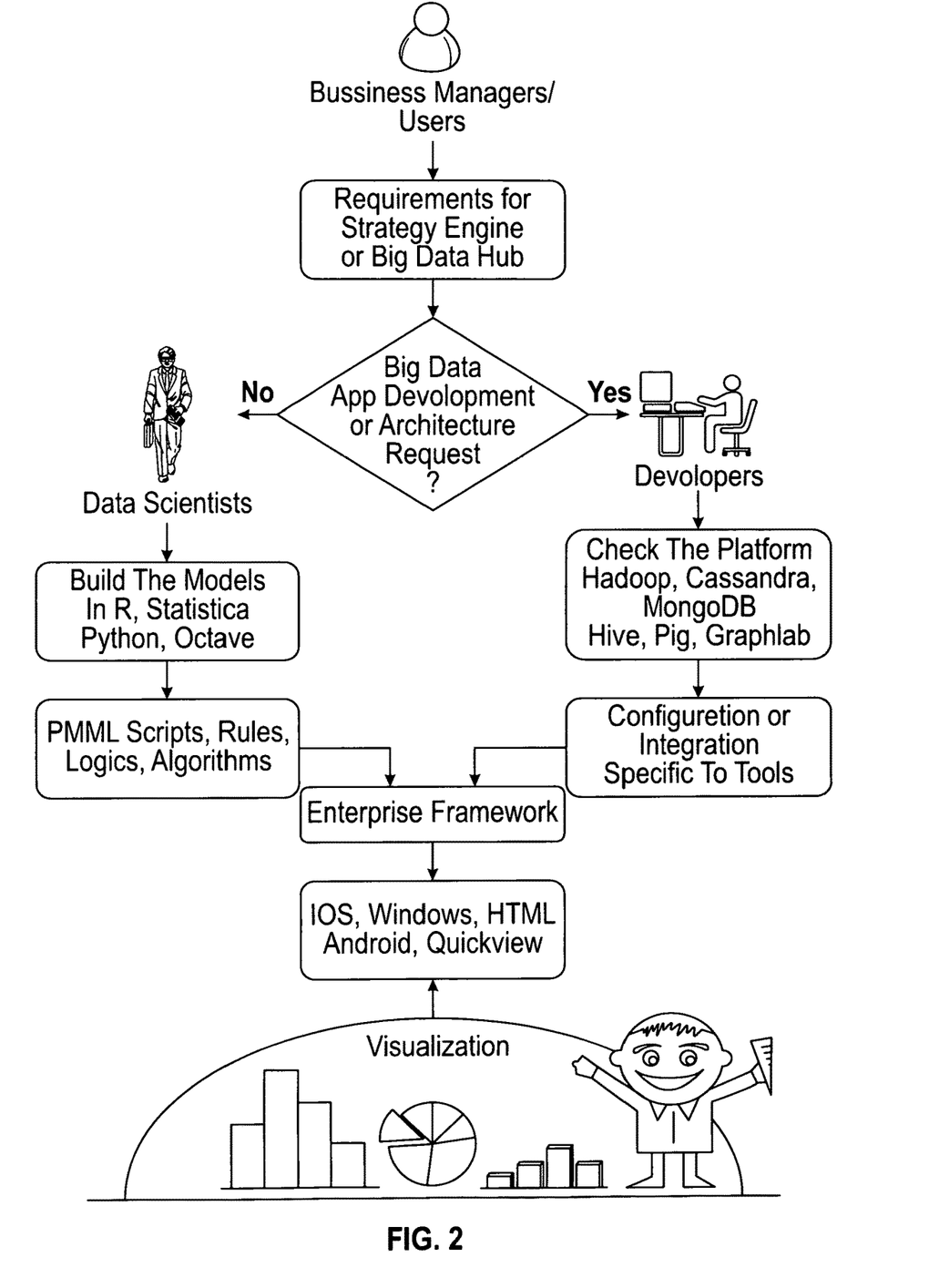
FIG. 2 is a block diagram illustrating various data scientists, developers, systems engineers and business users interact and build the big data analytics application in accordance to an exemplary embodiment of the present invention.

FIG. 2 illustrates a block diagram illustrating involving various stake holders like data scientists, developers, systems engineers and business users interact and build the big data analytics application in accordance to an exemplary embodiment of the present invention.

Figure 3:
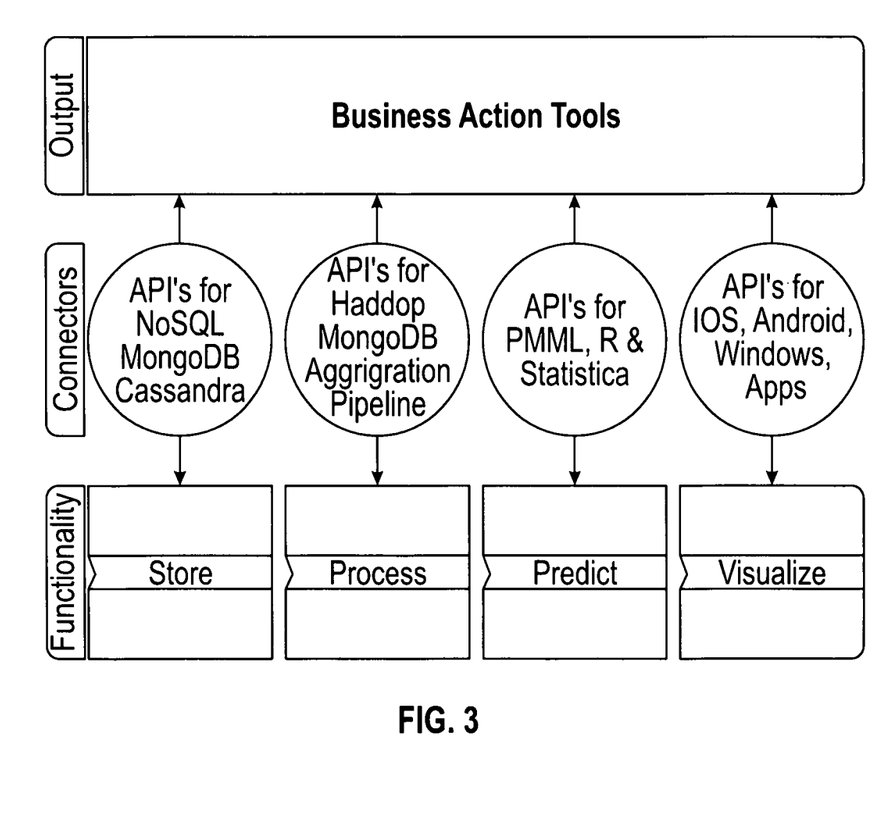
FIG. 3 is a block diagram illustrating the core architecture from business point of view according to an exemplary embodiment of the present invention.

FIG. 3 is a block diagram illustrating the core architecture from business point of view according to an exemplary embodiment of the present invention. The top layer 301 utilises the outcome from the enterprise framework in terms of business action tools, which will help business users to have access to the Big Data analytics application development environment. The middle layer 302 is provided for establishing connections from various functions to the outputs. The REST based APIs helps in establishing the connections. The lower most section 303 is a functionality unit which support store, process, predict and visualize functions.

Figure 4:
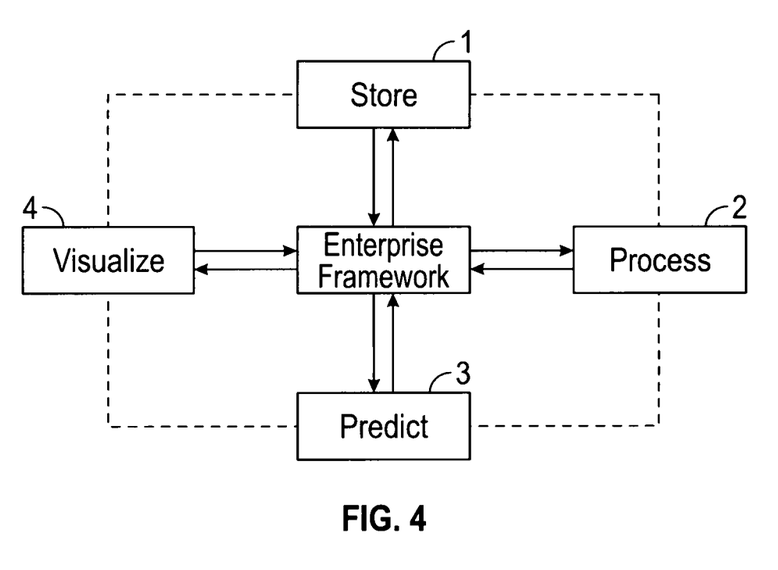
FIG. 4 is a block diagram illustrating explaining input-out relationship between each core modules of the big data analytics framework according to an exemplary embodiment of the present invention.

FIG. 4 is a block diagram illustrating explaining input-out relationship between each core modules of the big data analytics enterprise framework according to an exemplary embodiment of the present invention, wherein the enterprise framework core architecture explains the input-output relationship between the core functionalities. The dotted line illustrates the connection to the four functions indicates the flow from store to process, process to predict, and finally visualize. The store function interacts with the process, predict and visualize functions through the enterprise framework and vice versa.

Figure 5:
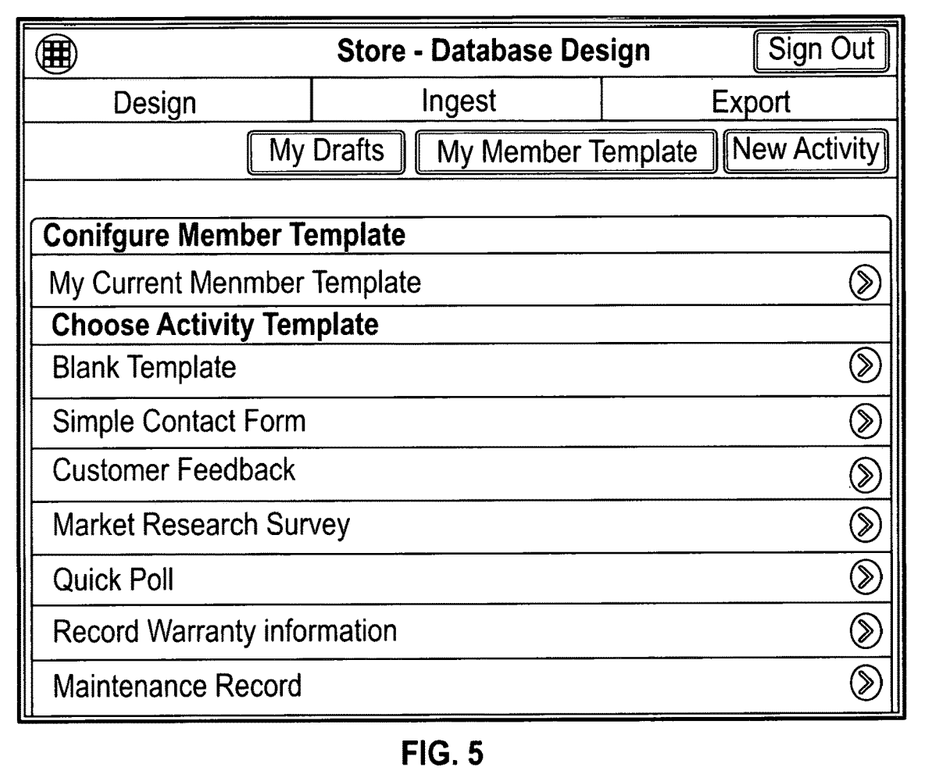
FIG. 5 is a flow diagram illustrating database design and storage functionality explorer view according to an exemplary embodiment of the present invention.
Figure 6:
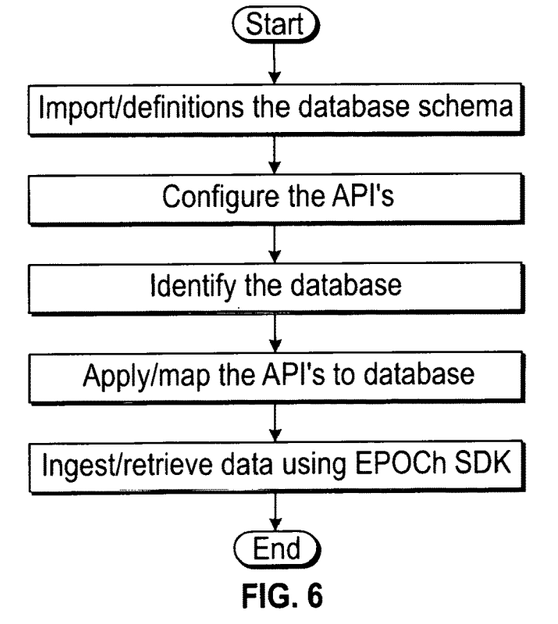
FIG. 6 is a flow diagram illustrating steps designed to enable database design and storage functionality according to an exemplary embodiment of the present invention.

FIG. 5 is a flow diagram illustrating database design and storage functionality explorer view according to an exemplary embodiment of the present invention, FIG. 6 is a flow diagram illustrating steps designed to enable database design and storage functionality according to an exemplary embodiment of the present invention, The Process include the store function basically has three main components design, ingest and export. The enterprise framework provides a visual schema designer to define Data schema for storing structured and unstructured Data. The data ingestion module comes built-in with a wide variety of adapters to push data from iOS, Android and HTML5 apps, third party platforms such as SalesForce.com, Social Media Aggregators, and File storage services such as Google Cloud Storage/S3 etc. The Data export module allows seamless download of large Data files. The enterprise framework SDK contain adapters for the software engineers to configure the Big Data hub. After defining the database schema the API's are configured and the APIs are mapped to the required database. Ingest function can be used to push the Data to the Database using the SDK.

Figure 7:
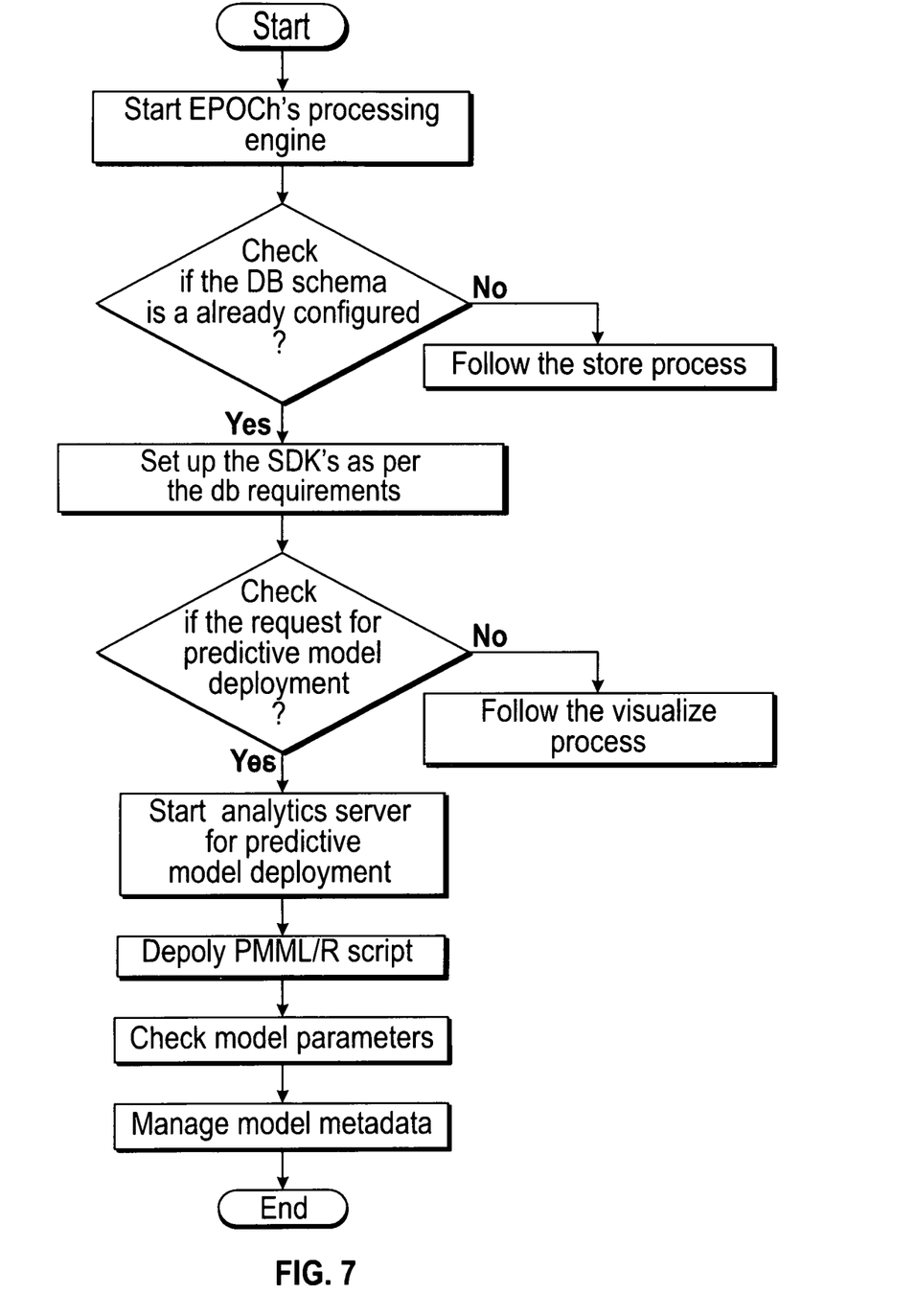
FIG. 7 is a block diagram illustrating steps involved in data processing and predictive model deployment layer in accordance with an exemplary embodiment of the present invention.

FIG. 7 is a block diagram illustrating steps involved in data processing and predictive model deployment layer in accordance with an exemplary embodiment of the present invention, wherein the processing and the model deployment initiates the EPOCH's processing engine, checks for data access request (or predictive model deployment request), and the REST based APIs will be invoked accordingly to generate the desired results. The enterprise framework comes with a process manager tool, which provides a quick snapshot of all active processes in the Data hub. Once the database schema is configured the report can be generated using adapters and the predictive models in the form of PMML script/R Script, which can be deployed, using the REST, based API's on the enterprise framework analytics server. The model metadata also can be managed through the APIs for processing and prediction.

Figure 8:
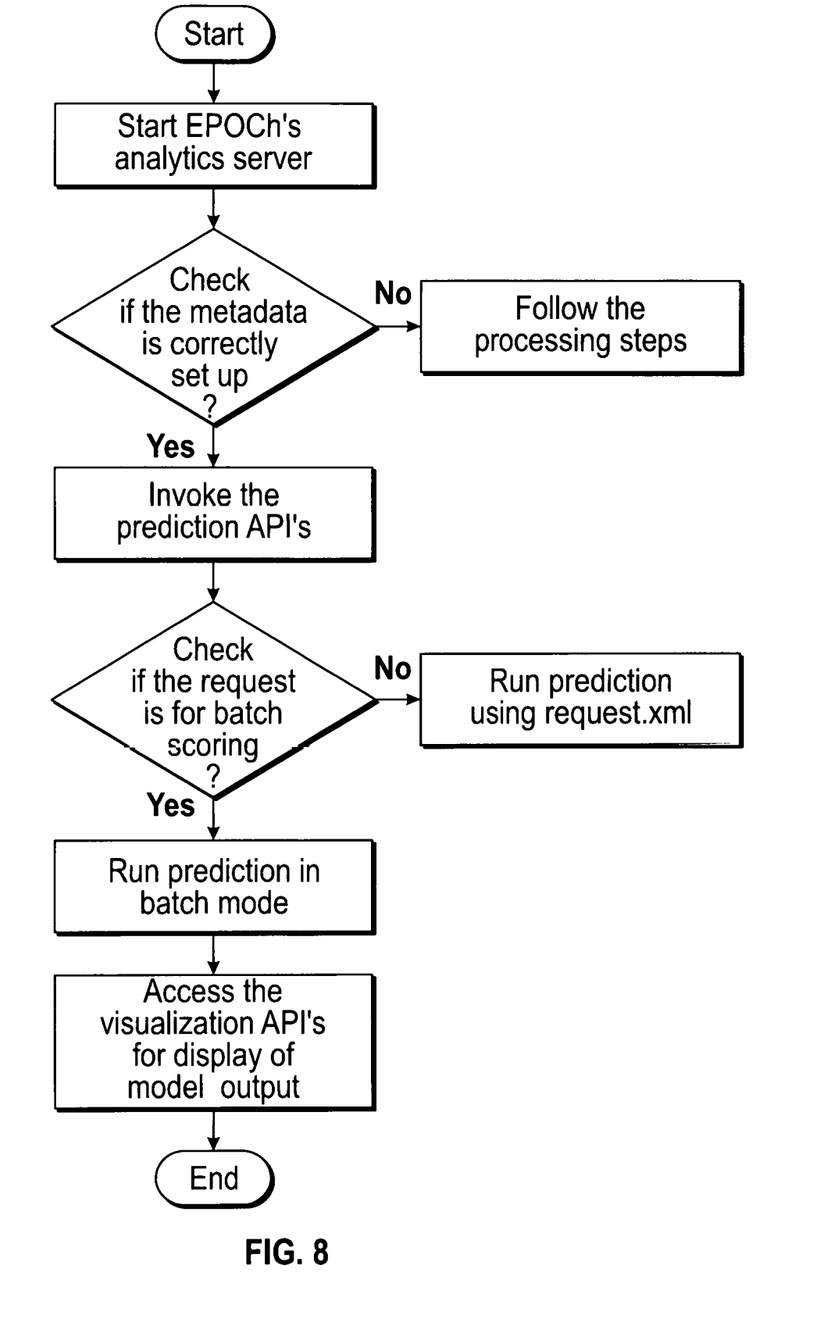
FIG. 8 is a block diagram illustrating steps involved in predict function layer in accordance with an exemplary embodiment of the present invention.

FIG. 8 is a block diagram illustrating steps involved in predict function layer in accordance with an exemplary embodiment of the present invention, wherein the metadata information is uploaded to the enterprise framework analytics server and the prediction APIs are invoked to generate the output. The output can be generated in batch mode and in standalone mode as well.

Figure 9:
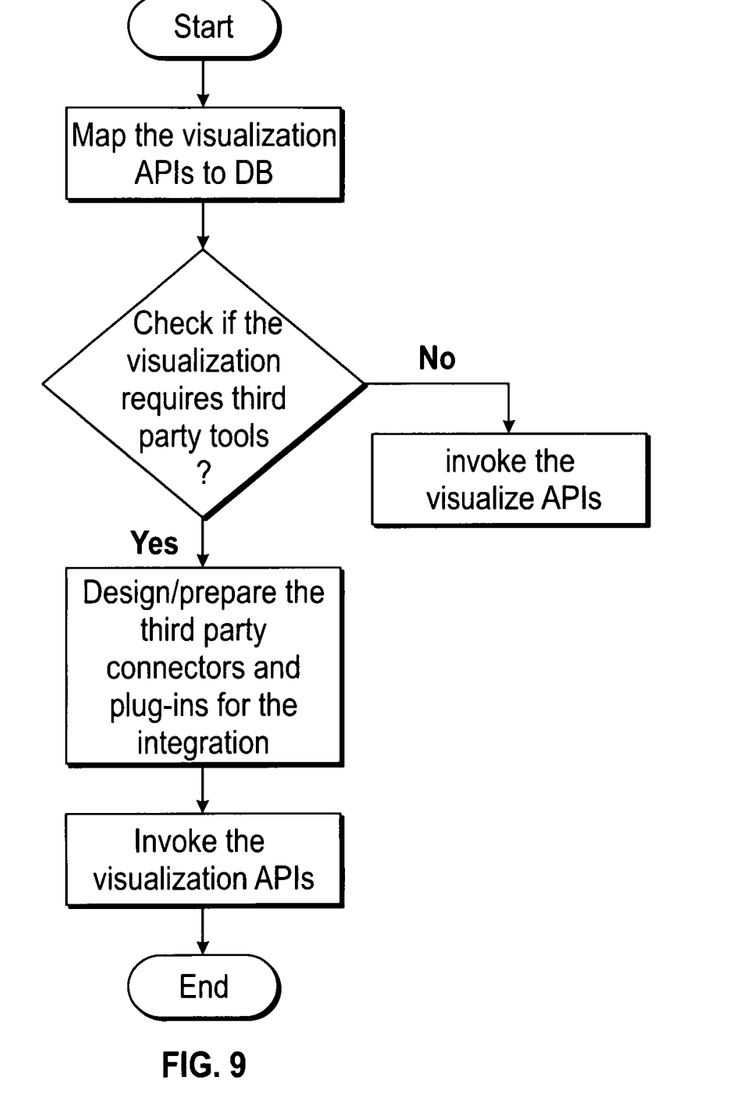
FIG. 9 is a block diagram illustrating steps involved in visualization and predictive model in accordance with an exemplary embodiment of the present invention.

FIG. 9 is a block diagram illustrating steps involved in visualization and predictive model in accordance with an exemplary embodiment of the present invention, wherein the data visualization and predictive model output can happen in two different ways, first through the enterprise framework visualization API, and secondly through enterprise framework third party (TPT) visualization connector APIs. The REST based API pushes the graphs and charts to the TPT and creates an environment for interactive graph analysis.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fibre optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for providing big data analytics, the method comprising steps of:
   providing a web-based explorer interface module to receive a database schema of a source database, wherein the database schema indicates how entities that make up a database relate to one another;
   configuring a pre-defined or custom based adapter module, which programmatically refers to the database schema defined using the web-based explorer interface module, to retrieve data from the source database of said database schema and ingest the retrieved data into a target database;
   providing a processor manager module configured to process the ingested data to obtain metrics, wherein the processing is based on how the metrics are defined;
   providing a predict manager module configured to assign an analytic task to a data scientist, wherein the data scientist uses a curl tool to pull said ingested data via REST (Representational State Transfer) architectural style APIs, and once the ingested data is built, the data scientist deploys a scoring engine using the curl tool; and
   providing a user interface module configured to provide visualization of the ingested data, in the form of charts;
   wherein the modules are coupled with a framework and integrated for ad-hoc big data gathering.

2. The method of claim 1, wherein the database schema is stored in form of structured and unstructured big data.

3. The method of claim 1, wherein each of the modules is created, tested initiated, stopped, restarted upgraded, modified, deleted, deployed, and un-deployed based on the request from application developers or software engineers or data scientists or business user.

4. The method of claim 1, wherein the framework is equipped with monitoring, management and control of service setup, software and hardware setup implemented by means of web-based portals in the framework.

5. The method of claim 1, wherein the framework is configured to enable identity management, policy driven access control, data privacy controls and authentication of various levels accessing the framework.

\* \* \* \* \*